UNITED STATES PATENT OFFICE.

PETER TOWNSEND AUSTEN, OF BROOKLYN, ASSIGNOR TO THE WM. J. MATHESON & COMPANY, LIMITED, OF NEW YORK, N. Y.

PROCESS OF MAKING COLORING-MATTER FROM LOGWOOD.

SPECIFICATION forming part of Letters Patent No. 542,403, dated July 9, 1895.

Application filed December 6, 1894. Serial No. 531,033. (No specimens.)

*To all whom it may concern:*

Be it known that I, PETER TOWNSEND AUSTEN, a citizen of the United States, and a resident of Brooklyn, in the county of Kings and State of New York, have invented a certain new and useful Process for Manufacturing Hematein, of which the following is a specification.

In the usual process of making extract from logwood the comminuted wood is subjected to the action of boiling water, after which the aqueous solution is concentrated either to the condition of a thick sirup or to a pitchy solid mass, or by the addition of certain chemicals it is converted into a dry and friable mass. I have been constantly experimenting for a number of years on the extraction and treatment of logwood products in the hope of obtaining the coloring-matter in a still purer condition than any yet put upon the market. These experiments have resulted in the discovery that borax exerts a most remarkable action in aiding the precipitation of the coloring-matter of logwood from its aqueous solution. I found that when a small percentage of borax was added to the hot liquor made by extracting logwood with water, and at a gravity of 20° Twaddle, and allowing the solution to cool, a large amount of a reddish precipitate was formed. This reddish precipitate, on being separated by filtration and dried, was found to consist of the coloring-matter of logwood in a comparatively pure state and to be of very great tinctorial power. On further concentration of the solution and again allowing it to cool another precipitation was produced, and this operation was repeated a number of times.

Having thus stated the discoveries resulting from my experiments, I will now procced to describe a process for the practical application thereof to the production of coloring matter from logwood.

When applying my process to a concentrated extract of logwood said extract is diluted with water until a gravity of about 20° Twaddle is reached. Borax dissolved in a small amount of water is then added in an amount of about two per cent. of the solution. After the addition of the borax the solution is stirred and heated. The liquor is now cooled and allowed to stand, when a precipitation of coloring-matter takes place. The precipitate is allowed to settle and the supernatent liquid is drawn off, after which the precipitate is freed from the adhering liquid by means of a filter-press, or by allowing it to drain on a filter, or by centrifugals. The coloring-matter is then dried and ground and will be found to be a permanent dye-stuff and not affected by atmospheric heat and practically non-deliquescent. The separated liquor may be further concentrated and then cooled, when an additional precipitate is produced, and this operation may be repeated, whereby a series of precipitates are obtained, all of which are coloring-matters similar to the first precipitate, but decreasing in purity as the proportion of impurity in the liquid increases.

The coloring-matter obtained by precipitation, as above described, forms a product varying from a bright brick-red to a brownish-red color. The dye-stuff resembles in appearance some of the coal-tar dyes. It is remarkably free from insoluble matter. It dyes wool prepared with chrome and tartar like logwood, but with a purer tone. In its behavior toward cotton the dye-stuff resembles logwood extract, but in a very much intensified degree.

In the process above described the logwood extract may be produced in an open vessel or in a closed vessel and with or without pressure or vacuum. The numbers given as to proportion and gravity are only examples, to which I do not limit myself, the essence of my invention or discovery being that when borax is contained in logwood extract a precipitation of coloring-matter takes place under the proper conditions of temperature and dilution.

What I claim is—

In the art of obtaining a technically pure coloring matter from logwood, the improvement which consists in dissolving borax in hot, dilute logwood extract and cooling the same sufficiently to cause a precipitate of coloring matter to form, and separating the precipitate from the remaining liquor as described.

Signed at Brooklyn, in the county of Kings and State of New York, this 4th day of December, A. D. 1894.

PETER TOWNSEND AUSTEN.

Witnesses:
JOHN O. N. DORR,
W. B. BEARDSLEY.